United States Patent
Akiyama et al.

(10) Patent No.: US 12,292,057 B2
(45) Date of Patent: May 6, 2025

(54) FLUID MACHINE

(71) Applicant: IHI Corporation, Tokyo (JP)

(72) Inventors: Masahiro Akiyama, Tokyo (JP); Yosuke Akamatsu, Tokyo (JP)

(73) Assignee: IHI Corporation, Tokyo (JP)

( * ) Notice: Subject to any disclaimer, the term of this patent is extended or adjusted under 35 U.S.C. 154(b) by 47 days.

(21) Appl. No.: 17/905,679

(22) PCT Filed: Apr. 15, 2020

(86) PCT No.: PCT/JP2020/016579
§ 371 (c)(1),
(2) Date: Sep. 6, 2022

(87) PCT Pub. No.: WO2021/210097
PCT Pub. Date: Oct. 21, 2021

(65) Prior Publication Data
US 2023/0110735 A1  Apr. 13, 2023

(51) Int. Cl.
*F04D 29/58* (2006.01)
*F04D 17/10* (2006.01)
*F04D 25/06* (2006.01)

(52) U.S. Cl.
CPC ....... *F04D 29/5813* (2013.01); *F04D 25/068* (2013.01); *F04D 29/5806* (2013.01); *F04D 17/10* (2013.01)

(58) Field of Classification Search
CPC ..... F04D 29/5806; F04D 29/082; H02K 9/06; H02K 11/33
See application file for complete search history.

(56) References Cited

U.S. PATENT DOCUMENTS

| 3,004,180 | A | * | 10/1961 | Macks ................. H02K 7/088 310/90 |
| 9,273,598 | B2 | | 3/2016 | An et al. |
| 2001/0036409 | A1 | | 11/2001 | Murata et al. |
| 2003/0047304 | A1 | | 3/2003 | Kasuga |
| 2004/0090130 | A1 | | 5/2004 | Kaneko et al. |

(Continued)

FOREIGN PATENT DOCUMENTS

| CN | 104659960 A | 5/2015 |
| GB | 2540009 A | 1/2017 |

(Continued)

OTHER PUBLICATIONS

Akamatsu et al., 'Fluid Machine' WO 2019/049202 including Mach. Trans., (Year: 2019).*

*Primary Examiner* — Kenneth J Hansen
(74) *Attorney, Agent, or Firm* — Rothwell, Figg, Ernst & Manbeck, P.C.

(57) ABSTRACT

A centrifugal blower includes a motor part having a rotor provided on a rotating shaft of an impeller, a coil provided around the rotor, and a motor housing that accommodates a coil, an inverter part having an inverter unit that supplies drive power to the motor part, and an inverter housing connected to the motor housing and configured to accommodate the inverter unit, and a cooling fan that is provided on the rotating shaft, rotates with the impeller and allows cooling air to flow through the inverter housing and the motor housing in order, wherein the inverter unit is disposed to be arranged with respect to the coil in a direction of a rotation axis of the rotor.

13 Claims, 7 Drawing Sheets

(56) References Cited

U.S. PATENT DOCUMENTS

| | | | |
|---|---|---|---|
| 2004/0170497 A1* | 9/2004 | Snyder | F04D 25/06 415/206 |
| 2007/0023421 A1 | 2/2007 | Kitamura et al. | |
| 2014/0144412 A1 | 5/2014 | An et al. | |
| 2014/0205478 A1 | 7/2014 | Guitari et al. | |
| 2016/0102677 A1 | 4/2016 | An et al. | |
| 2016/0276895 A1 | 9/2016 | Aizawa et al. | |
| 2017/0317557 A1* | 11/2017 | Inamura | H02K 9/06 |
| 2018/0219450 A1 | 8/2018 | Yamamoto | |

FOREIGN PATENT DOCUMENTS

| | | |
|---|---|---|
| JP | S51-34601 U | 3/1976 |
| JP | H5-191950 A | 7/1993 |
| JP | H7-035797 B2 | 4/1995 |
| JP | H10-103294 A | 4/1998 |
| JP | H11-346458 A | 12/1999 |
| JP | 2000-349233 A | 12/2000 |
| JP | 2001-342996 A | 12/2001 |
| JP | 2002-031084 A | 1/2002 |
| JP | 3307386 B2 | 7/2002 |
| JP | 2004-135447 A | 4/2004 |
| JP | 2004-197714 A | 7/2004 |
| JP | 3559909 B2 | 9/2004 |
| JP | 2007-037262 A | 2/2007 |
| JP | 2009-168241 A | 7/2009 |
| JP | 2009-278810 A | 11/2009 |
| JP | 2013-024041 A | 2/2013 |
| JP | 2014-513772 A | 6/2014 |
| JP | 2016-220357 A | 12/2016 |
| JP | 2017-147919 A | 8/2017 |
| JP | 6184520 B2 | 8/2017 |
| JP | 2017-166330 A | 9/2017 |
| JP | 2017-195663 A | 10/2017 |
| JP | 2018-122665 A | 8/2018 |
| JP | 2020-067019 A | 4/2020 |
| WO | WO-2019049202 A1 * | 3/2019 ............ F04D 17/10 |

* cited by examiner

FLUID MACHINE

CROSS REFERENCE TO RELATED APPLICATION

This application is a 35 U.S.C. 371 National Phase Entry Application from PCT/JP2020/016579, filed Apr. 15, 2020, the disclosure of which is incorporated herein by reference in its entirety, and priority is claimed to each of the foregoing.

TECHNICAL FIELD

The present disclosure relates to a fluid machine.

BACKGROUND ART

In fluid machines such as blowers and compressors, an electric motor may be used as a drive source for an impeller. In this case, it is necessary to cool the electric motor that generates heat during an operation of the fluid machine. For example, in a fluid machine of Patent Literature 1, a cooling fan is provided on a rotating shaft of an impeller, and cooling air flows in a motor housing due to the cooling fan. This cooling air cools a rotor and a stator which are main heat sources.

CITATION LIST

Patent Literature

[Patent Literature 1] Japanese Unexamined Patent Publication No. 2017-166330

SUMMARY

In this type of fluid machine, it is conceivable that there is an inverter that supplies drive power to the electric motor. In this case, since the inverter may also be a heat source, it is also necessary to cool the inverter in the same manner. However, when a cooling mechanism of the inverter is provided in addition to the cooling mechanism of the electric motor as described above, it hinders miniaturization of the entire device. In order to achieve the miniaturization of the device, it is desired to share the cooling mechanism of the electric motor and the cooling mechanism of the inverter. The present disclosure describes a fluid machine in which the cooling mechanism of the electric motor and the cooling mechanism of the inverter are shared.

A fluid machine according to an aspect of the present disclosure includes a motor part having a rotating shaft, an electric motor configured to rotate the rotating shaft, and a motor housing configured to accommodate the electric motor; an inverter part having an inverter unit configured to supply drive power to the motor part, and an inverter housing connected to the motor housing and configured to accommodate the inverter unit; and a cooling fan provided on the rotating shaft and configured to allow cooling air to flow through the inverter housing and the motor housing in order, wherein the inverter unit is disposed to be arranged with respect to the electric motor in an axial direction of the rotating shaft.

According to the fluid machine of the present disclosure, the cooling mechanism of the electric motor and the cooling mechanism of the inverter can be shared.

DESCRIPTION OF EMBODIMENTS

A fluid machine according to an aspect of the present disclosure includes a motor part having a rotating shaft, an electric motor that rotates the rotating shaft, and a motor housing that accommodates the electric motor, an inverter part having an inverter unit that supplies drive power to the motor part and an inverter housing that is connected to the motor housing and accommodates the inverter unit, and a cooling fan that is provided on the rotating shaft and allows cooling air to flow through the inverter housing and the motor housing in order, wherein the inverter unit is disposed to be arranged with respect to the electric motor in an axial direction of the rotating shaft.

The inverter housing may have a cylindrical side wall that surrounds a rotation axis of the rotating shaft and extends in a direction of the rotation axis, and an intake port that is provided in the side wall and suctions cooling air from the outside, and the inverter unit may be disposed in a region in which the rotation axis intersects inside the intake port.

A heat sink that faces the intake port may be mounted on an outer peripheral portion of the inverter unit.

The inverter housing may have an air filter provided in the intake port.

The motor part may have a gas bearing that pivotally supports the rotating shaft.

A part of the rotating shaft may be disposed to be surrounded by the inverter unit.

A fluid machine of the present disclosure is a fluid machine including a rotating shaft, an electric motor that rotates the rotating shaft, an inverter unit that supplies drive power of the electric motor, a cooling fan that rotates together with the rotating shaft to generate a flow of cooling air, a motor housing accommodating the electric motor and having a motor cooling flow path configured to allow the cooling air to pass therethrough to cool the electric motor, a fan accommodation flow path that communicates with the motor cooling flow path, accommodates the cooling fan and allows the cooling air to pass therethrough in a rotation radial direction of the rotating shaft, and an inverter housing communicating with the motor cooling flow path and having an inverter cooling flow path configured to allow the cooling air to pass therethrough to cool the inverter unit, wherein the fan accommodation flow path, the motor cooling flow path, and the inverter cooling flow path are arranged in an axial direction along the rotating shaft.

Figure 1:
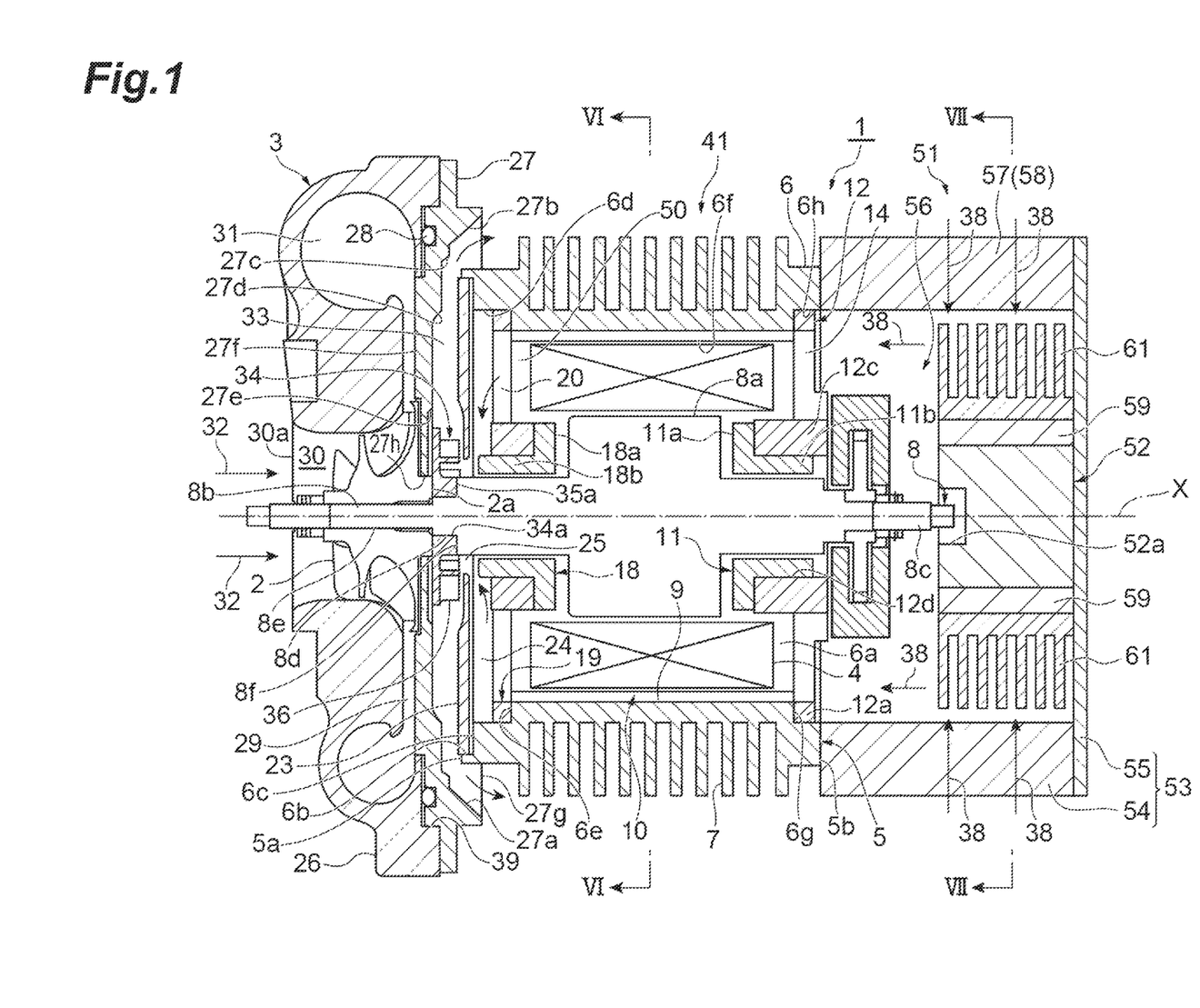
FIG. 1 is a cross-sectional view showing a fluid machine according to an embodiment of the present disclosure.

The fluid machine according to the embodiment of the present disclosure will be described with reference to FIG. 1. In FIG. 1, the left side of the drawing is referred to as a tip end (a first end) side, and the right side of the drawing is referred to as a base end (a second end) side. In the following description, the terms "tip end side" and "base end side" are used with reference to an axial direction.

In the present embodiment, a centrifugal blower 1 will be described as an example of the fluid machine. The centrifugal blower 1 is, for example, an air-cooled electric blower that suctions air and sends it out at a predetermined pressure. The centrifugal blower 1 has an air inlet port on the tip end side. The centrifugal blower 1 (the fluid machine) includes an impeller housing 3 in which an impeller 2 is accommodated, and a motor part 41 as a drive source for rotating the impeller 2. The motor part 41 includes a rotor 8a fixed to a rotating shaft 8 of the impeller 2, a coil 4 (a stator) provided around the rotor 8a, and a motor housing 5 in which the coil 4 is accommodated. Further, the centrifugal blower 1 includes an inverter part 51. The inverter part 51 supplies drive power to the motor part 41.

The motor housing 5 includes a cylindrical motor housing main body part 6. Radiation fins 7 are formed on an outer peripheral surface of the motor housing main body part 6. The motor housing main body part 6 includes a first end 5a on the tip end side and a second end 5b on the base end side in the axial direction. The motor housing main body part 6 has an insertion hole 6a which extends in the axial direction between the first end 5a and the second end 5b. The rotating shaft 8 made of, for example, stainless steel is inserted through the motor housing main body part 6.

The rotating shaft 8 is supported by a first bearing part 18 provided in the vicinity of the first end 5a in the motor housing main body part 6, and a second bearing part 11 provided in the vicinity of the second end 5b in the motor housing main body part 6. The rotating shaft 8 is rotatable about a rotation axis X thereof.

The rotating shaft 8 has a first end portion 8b which protrudes from the first end 5a of the motor housing main body part 6 in the axial direction and a second end portion 8c which protrudes from the second end 5b of the motor housing main body part 6 in the axial direction. The impeller 2 made of, for example, aluminum is mounted on the first end portion 8b which is a protruding portion of the rotating shaft 8. More specifically, a through hole is formed in the impeller 2 along the rotation axis X, and the first end portion 8b of the rotating shaft 8 is inserted through the through hole. For example, a male screw is formed on a peripheral surface of the first end portion 8b. A boss portion 2a which protrudes in a back surface direction is formed in the center of the impeller 2 on the base end side.

The motor housing main body part 6 includes a first opening portion formed on the tip end side of the insertion hole 6a and a second opening portion formed on the base end side of the insertion hole 6a. The insertion hole 6a includes a first cylindrical portion 6b which extends from the first opening portion to the base end side, an annular first step portion 6c of which a diameter reduces from the first cylindrical portion 6b, a second cylindrical portion 6d which extends from the first step portion 6c to the base end side, an annular second step portion 6e of which a diameter is reduced from the second cylindrical portion 6d, a third cylindrical portion 6f which extends from the second step portion 6e to the base end side, an annular third step portion 6g of which a diameter increases from the third cylindrical portion 6f, and a fourth cylindrical portion 6h which extends from the third step portion 6g to the second opening portion. In other words, a diameter of the first cylindrical portion 6b is larger than a diameter of the second cylindrical portion 6d. Each of a diameter of the second cylindrical portion 6d and a diameter of the fourth cylindrical portion 6h may be larger than a diameter of the third cylindrical portion 6f. The third cylindrical portion 6f is a portion which has the smallest diameter in the insertion hole 6a of the motor housing main body part 6, for example.

The rotor 8a is fixed to a central portion of the rotating shaft 8 in the axial direction. An outer diameter of the rotor 8a may be larger than other portions of the rotating shaft 8. The rotor 8a includes a magnetic field generating source such as a permanent magnet. The rotor 8a is accommodated in the motor housing main body part 6. That is, both ends of the rotor 8a in the axial direction are located between the first end 5a and the second end 5b of the motor housing main body part 6.

The coil 4 is provided inside the motor housing main body part 6. The coil 4 is, for example, an electromagnetic coil. The coil 4 is fixed to the third cylindrical portion 6f (an inner peripheral surface) of the motor housing main body part 6. The coil 4 may include, for example, a conductive wire and a stator core which is an iron core on which the conductive wire is wound (all of them not shown). The coil 4 is disposed around the rotor 8a and faces the rotor 8a with a gap therebetween. An electric motor 10 of the present embodiment includes the stator including the coil 4 and the rotor 8a. The coil 4 can be energized via a wiring (not shown). A rotating magnetic field is generated between the coil 4 and the rotor 8a by energizing the coil 4, and thus the rotor 8a rotates.

An arrangement of the coil 4 will be described in more detail. The coil 4 is spaced apart from the first end 5a and the second end 5b of the motor housing 5 in the axial direction. In other words, the coil 4 is shorter than a length between the first end 5a and the second end 5b in the axial direction. The coil 4 is shorter than a length of the third cylindrical portion 6f in the axial direction. The coil 4 is accommodated in the third cylindrical portion 6f.

Figure 6:
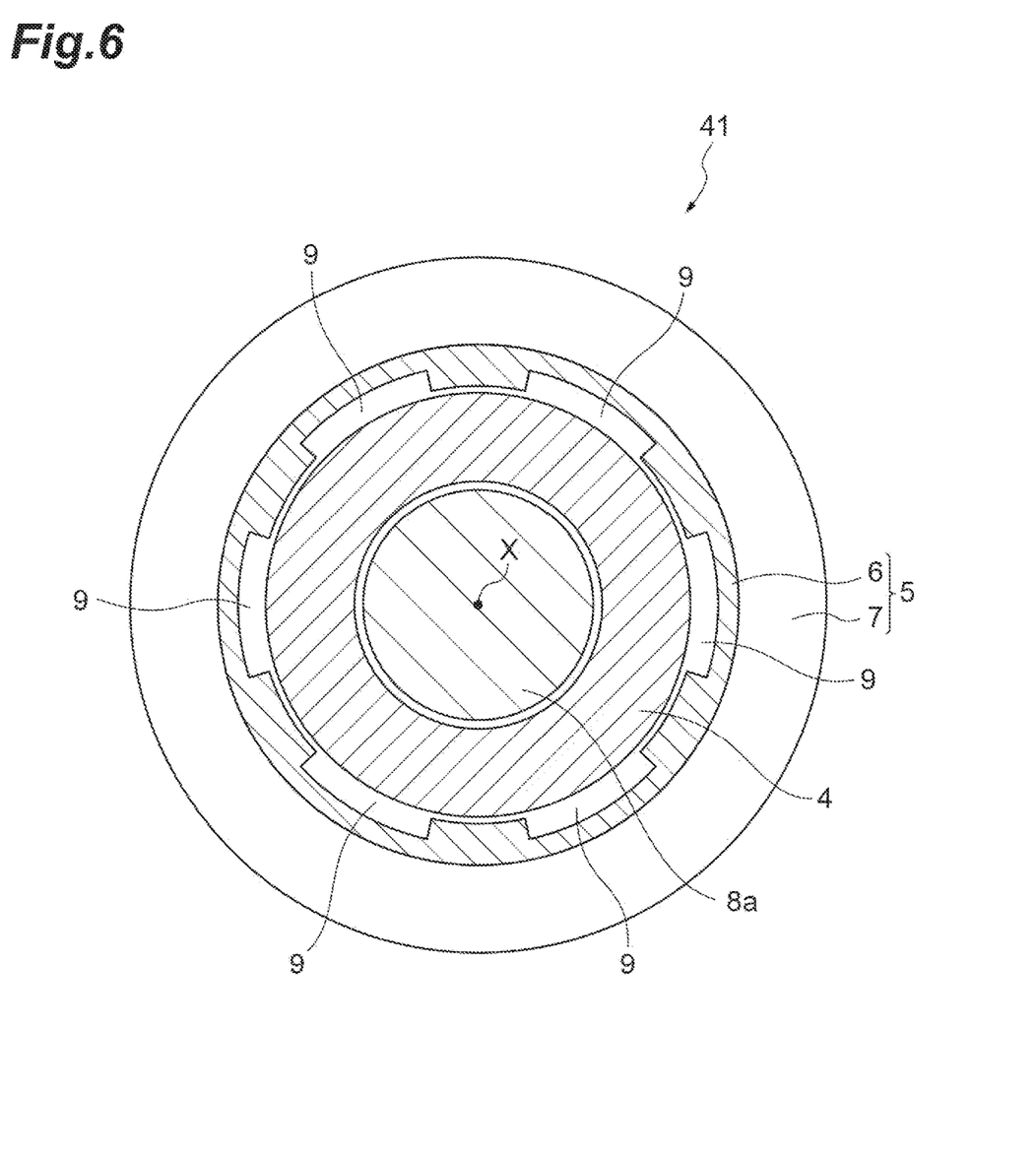
FIG. 6 is a cross-sectional view taken along line VI-VI of FIG. 1.

As shown in FIG. 6, one or a plurality of grooves 9 are provided in the motor housing main body part 6. When a direction in which the groove 9 extends is divided into an axial component and a circumferential component, the direction in which the groove 9 extends includes at least the axial component. The groove 9 is formed in, for example, the third cylindrical portion 6f, and is connected to the second step portion 6e and the third step portion 6g. A bottom portion of the groove 9 (a portion farthest from the rotation axis X) is radially spaced apart from the coil 4 provided in the third cylindrical portion 6f. The groove 9 defines a space which extends in the axial direction on the outer peripheral side of the coil 4.

In the present embodiment, for example, a plurality of grooves 9 are formed. The plurality of grooves 9 are formed, for example, at a predetermined angular pitch. For example, six grooves 9 are formed at an angular pitch of 60°. The plurality of grooves 9 extend in the axial direction and may be parallel to each other. The one or the plurality of grooves 9 may extend spirally around the rotation axis X.

The grooves 9 may extend in the axial direction over a region in which the coil 4 is provided. In other words, the grooves 9 are longer than a length of the coil 4 in the axial direction.

A portion of the rotating shaft 8 located on the tip end side from the rotor 8a is supported by the first bearing part 18. A portion of the rotating shaft 8 located on the base end side from the rotor 8a is supported by the second bearing part 11. That is, the rotating shaft 8 is rotatably supported by the first bearing part 18 and the second bearing part 11. The first bearing part 18 includes a cylindrical support portion 18b which faces the rotating shaft 8 and supports the rotating shaft 8, and a flange portion 18a which is provided at a base end portion of the support portion 18b in the axial direction and protrudes outward in a radial direction. The second bearing part 11 includes a cylindrical support portion 11b which faces the rotating shaft 8 and supports the rotating shaft 8, and a flange portion 11a which is provided at a tip end portion of the support portion 11b in the axial direction and protrudes outward in the radial direction. The first bearing part 18 and the second bearing part 11 are gas bearings. In the present embodiment, the first bearing part 18 and the second bearing part 11 are dynamic pressure air bearings. During the operation of the centrifugal blower 1, an air layer is formed between the rotating shaft 8 and the support portions 18b and 11b by high-speed rotation of the rotating shaft 8, and the rotating shaft 8 is pivotally supported in a state in which it is separated from the support portions 18b and 11b. The first bearing part 18 and the second bearing part 11 may be static pressure air bearings.

A first bearing plate 19 is fitted to the second cylindrical portion 6d of the motor housing main body part 6. The first bearing plate 19 is an annular member which is fitted to the first end 5a side of the motor housing main body part 6 and holds the first bearing part 18. A second bearing plate 12 is fitted to the fourth cylindrical portion 6h of the motor housing main body part 6. The second bearing plate 12 is an annular member which is fitted to the second end 5b side of the motor housing main body part 6 and holds the second bearing part 11.

The second bearing plate 12 will be described with reference to FIGS. 1 and 2. The first bearing plate 19 may have the same structure as the second bearing plate 12. The first bearing plate 19 and the first bearing part 18 have, for example, a structure which is plane-symmetric with the second bearing plate 12 and the second bearing part 11 with respect to a plane that is perpendicular to the rotation axis X. Hereinafter, only the second bearing plate 12 will be described, and detailed description of the first bearing plate 19 will be omitted.

Figure 2:
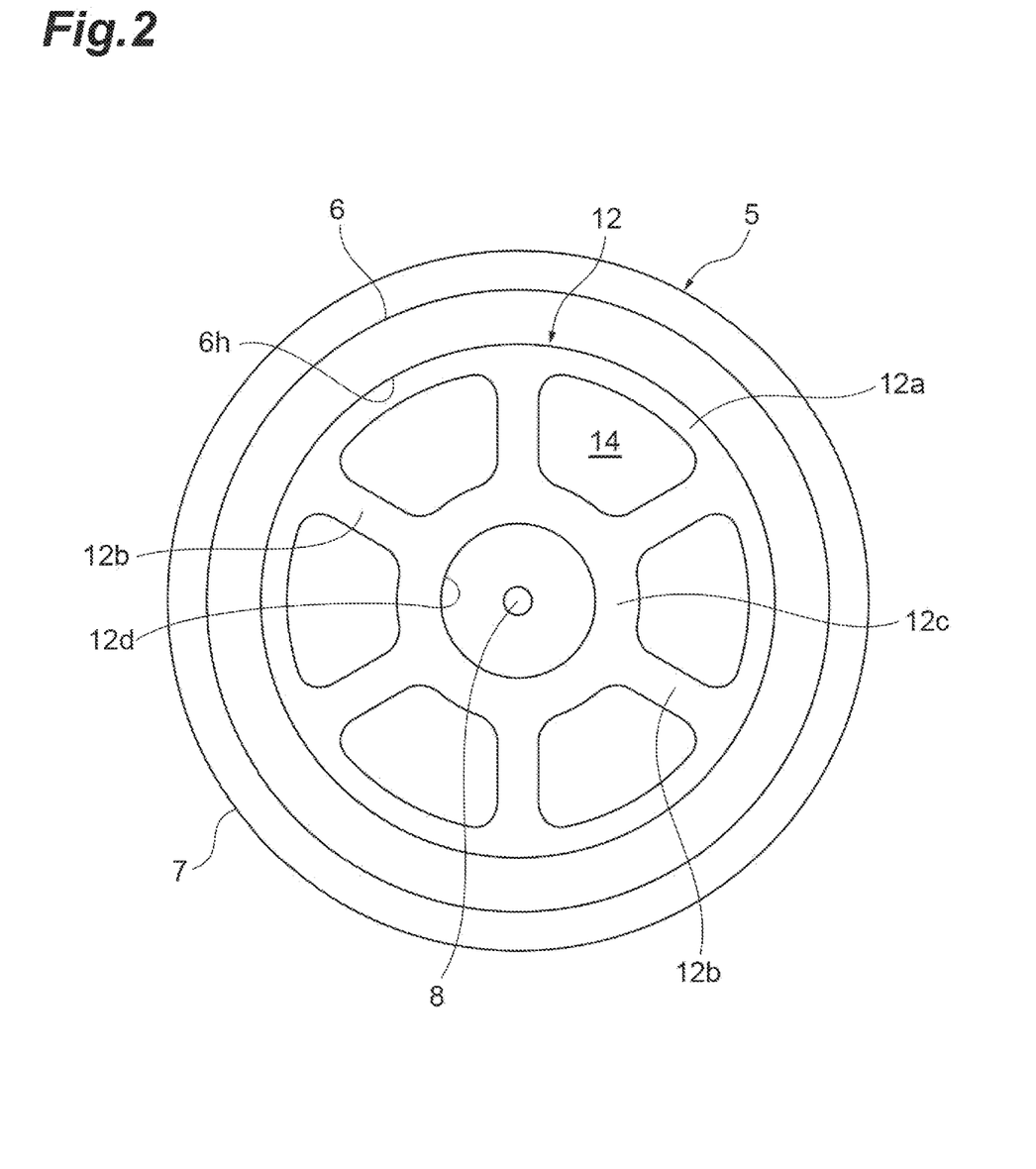
FIG. 2 is a view showing a motor housing in FIG. 1 when seen from the second end side in an axial direction.

As shown in FIG. 2, the second bearing plate 12 includes an annular rim portion 12a fitted to the fourth cylindrical portion 6h of the motor housing main body part 6, a cylindrical hub portion 12c to which the second bearing part 11 is fixed, and a plurality of spoke portions 12b which connect the rim portion 12a to the hub portion 12c. An insertion hole 12d is formed in and passes through the hub portion 12c in the axial direction. The support portion 11b and the rotating shaft 8 supported by the support portion 11b are inserted through the insertion hole 12d.

The rim portion 12a of the second bearing plate 12 is fitted into the fourth cylindrical portion 6h of the motor housing main body part 6 and is fixed to the third step portion 6g by a bolt or the like. The flange portion 11a of the second bearing part 11 is fixed to the hub portion 12c of the second bearing plate 12 with a bolt or the like. Thus, the second bearing part 11 is fixed to the hub portion 12c. The second bearing plate 12 restricts displacement of the second bearing part 11 in the axial direction and the radial direction.

A plurality of ventilation ports 14 which pass therethrough in the axial direction are provided in the second bearing plate 12 on the outer peripheral side of the hub portion 12c. The ventilation ports 14 communicate with a space on the second end 5b side of the motor housing main body part 6 and an opening on the base end side of the third cylindrical portion 6f. A region between the rim portion 12a and the hub portion 12c, which is not blocked by the spoke portions 12b, is the ventilation port 14.

The ventilation port 14 is provided on the second end 5b side of the motor housing 5, and communicates with an inverter chamber 56 which will be described later, and also communicates with the insertion hole 6a of the motor housing main body part 6. The plurality of ventilation ports 14 are formed in the second bearing plate 12, for example, at a predetermined angular pitch. A filter (not shown) such as a dustproof filter may be provided in the ventilation port 14.

On the other hand, the first bearing plate 19 also includes a rim portion, a hub portion, and a plurality of spoke portions. The rim portion of the first bearing plate 19 is fitted into the second cylindrical portion 6d of the motor housing main body part 6 and is fixed to the second step portion 6e. The flange portion 18a of the first bearing part 18 is fixed to the hub portion of the first bearing plate 19. The first bearing plate 19 restricts displacement of the first bearing part 18 in the axial direction and the radial direction. A plurality of openings 20 are formed on the outer peripheral side of the hub portion, for example, at a predetermined angular pitch. The openings 20 communicate with the opening of the third cylindrical portion 6f on the tip end side. That is, the opening 20 communicates with the insertion hole 6a of the motor housing main body part 6.

Figure 3:
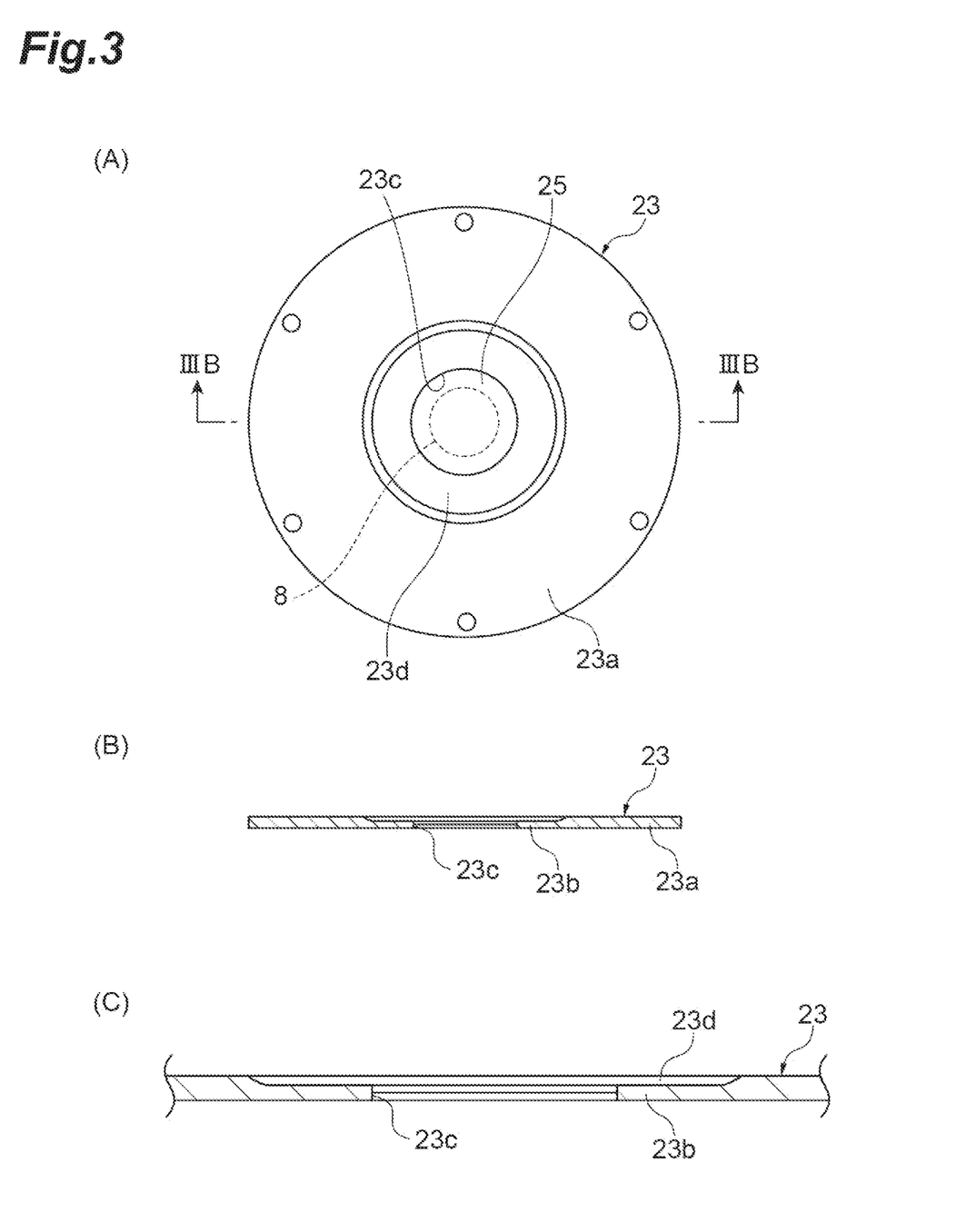
FIG. 3(A) is a front view showing a flow path forming plate in FIG. 1.
FIG. 3(B) is a cross-sectional view taken along line IIIB-IIIB of FIG. 3(A)
FIG. 3(C) is an enlarged view of a main portion of FIG. 3(B).

Next, a flow path forming plate 23 provided at the first end 5a of the motor housing 5 will be described with reference to FIG. 1 and FIGS. 3(A) to 3(C). As shown in FIG. 1 and FIG. 3(A), the annular flow path forming plate 23 is fitted to the first cylindrical portion 6b of the motor housing main body part 6. The flow path forming plate 23 includes an annular outer peripheral plate portion 23a which is fitted to the first cylindrical portion 6b, and an inner peripheral plate portion 23b which extends contiguously from the inside of the outer peripheral plate portion 23a. A circular flow path forming hole 23c which passes therethrough in the axial direction is formed in the center of the inner peripheral plate portion 23b.

As shown in FIGS. 1 and 3(B), the inner peripheral plate portion 23b is thinner than the outer peripheral plate portion 23a in the axial direction. More specifically, the outer peripheral plate portion 23a has a constant thickness. The inner peripheral plate portion 23b is inclined from an inner peripheral end of the outer peripheral plate portion 23a toward the flow path forming hole 23c and becomes thinner toward the flow path forming hole 23c. A back surface of the flow path forming plate 23 which faces the insertion hole 6a (faces the coil 4) is flat, but a surface of the flow path forming plate 23 on the side opposite thereto has a recessed portion 23d in the center (FIG. 3(A) and FIG. 3(C)). The flow path forming plate 23 may protrude from the first opening portion of the motor housing main body part 6 on the tip end side. That is, a part of the flow path forming plate 23 in a thickness direction (the axial direction) may be fitted to the first cylindrical portion 6b.

The flow path forming plate 23 is spaced apart from the first bearing plate 19 in the axial direction. The flow path forming plate 23 is also spaced apart from the first bearing part 18 mounted on the first bearing plate 19. That is, a space 24 which extends in the radial direction is formed between the flow path forming plate 23 and the first bearing plate 19. The opening 20 of the first bearing plate 19 is configured to communicate between the insertion hole 6a of the motor housing main body part 6 and the space 24.

The flow path forming hole 23c provided in the flow path forming plate 23 is formed around, for example, the rotation axis X. The flow path forming hole 23c forms an exhaust port (a first opening) 25 provided on the first end 5a side of the motor housing 5. The flow path forming hole 23c, that is, the exhaust port 25 communicates with the insertion hole 6a, the opening 20, and the space 24. The rotating shaft 8 is inserted through the flow path forming hole 23c. In the present embodiment, the exhaust port 25 is smaller than the ventilation port 14. A size of the exhaust port 25 may be changed as appropriate.

The motor housing 5 is configured of the motor housing main body part 6, the second bearing plate 12, the first bearing plate 19, the flow path forming plate 23, and the like. Additionally, an in-housing flow path 50 that communicates between the ventilation port 14 and the exhaust port 25 is formed in the motor housing 5. The in-housing flow path 50 is formed in a gap between an inner wall surface of the motor housing main body part 6, the coil 4, the rotating shaft 8, the second bearing plate 12, the second bearing part 11, the first bearing plate 19, and the first bearing part 18.

As shown in FIG. 1, the impeller 2 mounted on the first end portion 8b of the rotating shaft 8 is accommodated in the impeller housing 3. The impeller housing 3 includes an opening 30a which is an inlet port provided on the tip end side in the axial direction, an inlet flow path 30 which extends from the opening 30a to the base end side, a diffuser (an annular flow path) 29 which communicates with the inlet flow path 30 and is formed to surround the impeller 2, a scroll 31 which is provided on an outer periphery of the diffuser 29 and communicates with the diffuser 29, and an air outlet which is provided on the downstream side of the scroll 31. The impeller housing 3 includes, for example, an impeller housing main body part 26 and a disc-shaped closing plate 27 mounted on the base end side of the impeller housing main body part 26.

The scroll 31 is formed in the impeller housing main body part 26. The impeller housing main body part 26 includes a circular opening 30a formed on the tip end side of the inlet flow path 30, and a circular opening 39 which faces the opening 30a in the axial direction, communicates with the inlet flow path 30 and is formed on the base end side.

The closing plate 27 is disposed on the back surface side of the impeller 2 (the rotor 8a side). The closing plate 27 is fitted in, for example, an opening 39 of the impeller housing main body part 26 on the base end side. The closing plate 27 and the impeller housing main body part 26 are fixed to each other by, for example, a bolt or the like. The closing plate 27 includes a first surface 27f provided on the impeller 2 side, and a second surface 27g provided on the motor housing 5 side. The first surface 27f defines the diffuser 29 together with the impeller housing 3. An O-ring 28 is disposed on an outer periphery of the opening B of the impeller housing main body part 26. The impeller housing main body part 26 and the closing plate 27 sandwich the O-ring 28 to seal a flow path of a main air flow 32.

A recessed surface (a facing portion) 27a which is recessed toward the impeller 2 side is formed in the second surface 27g. That is, the recessed surface 27a is disposed between the motor housing 5 and the impeller 2. In the axial direction, the first end 5a of the motor housing main body part 6 is located closer to the impeller 2 than the second surface 27g of the closing plate 27. The first end 5a of the motor housing main body part 6 is inserted into a recessed portion formed by the recessed surface 27a. In other words, the recessed surface 27a receives the first end 5a of the motor housing main body part 6. The recessed surface 27a faces the motor housing 5 on the first end 5a side in the axial direction.

The first end 5a of the motor housing main body part 6 and the recessed surface 27a are spaced apart from each other in the axial direction. An exhaust flow path 33 which allows communication between the exhaust port 25 and the external air is formed between the first end 5a of the motor housing main body part 6 and the recessed surface 27a.

A shape of the closing plate 27 will be described in more detail. A circular through hole 27h is formed in and passes through the center of the closing plate 27 in the axial direction. The boss portion 2a provided on the back surface of the impeller 2 is inserted through the through hole 27h. That is, the boss portion 2a passes through the closing plate 27. A length of the boss portion 2a in the axial direction is substantially equal to that of the through hole 27h of the closing plate 27 in the axial direction. Accordingly, a part of the back surface of the impeller 2 is located on the motor housing 5 side of the recessed surface 27a.

Figure 5:
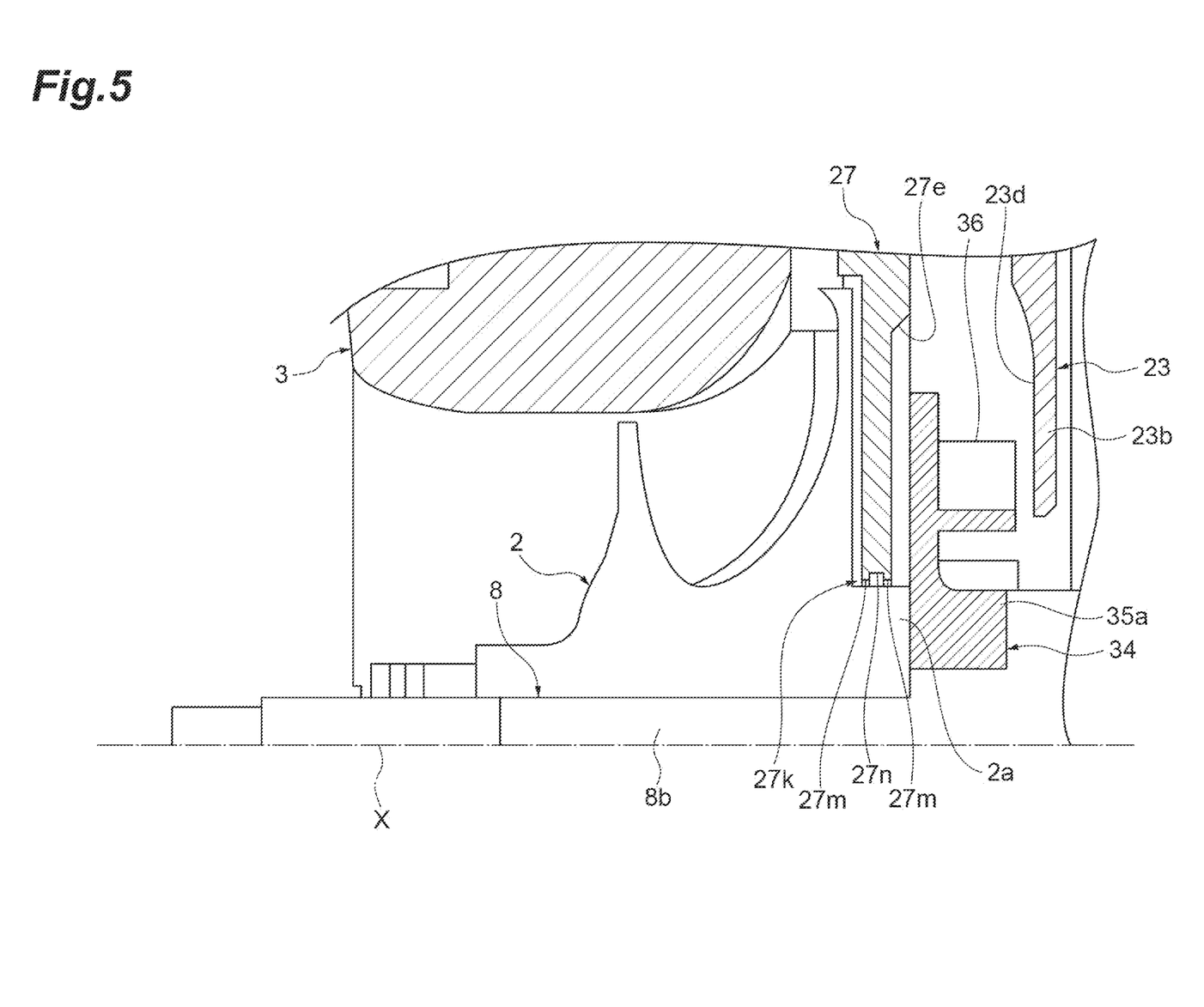
FIG. 5 is a cross-sectional view showing a seal portion formed around a boss portion of an impeller in FIG. 1.

A structure of the closing plate 27 around the impeller 2 will be described in more detail with reference to FIG. 5. As shown in FIG. 5, the closing plate 27 includes a seal portion 27k which faces the boss portion 2a of the impeller 2 on the inner diameter side. The seal portion 27k is formed at a peripheral edge portion of the through hole 27h. The seal portion 27k seals the motor housing main body part 6 (the motor housing 5) and the impeller 2. The seal portion 27k has an annular recessed portion 27n which is spaced outward from the boss portion 2a in the radial direction, and an annular protrusion portion 27m which is formed on both sides of the recessed portion 27n in the axial direction and protrudes from a bottom of the recessed portion 27n toward the boss portion 2a of the impeller 2. Accordingly, a groove is formed in an inner peripheral surface of the seal portion 27k in a circumferential direction. The groove of the seal portion 27k of the present embodiment has a rectangular shaped section in the axial direction. The boss portion 2a of the impeller 2 and the protrusion portion 27m of the seal portion 27k are spaced apart from each other in the radial direction. The seal portion 27k forms a non-contact seal structure between the seal portion 27k and the boss portion 2a of the impeller 2.

As shown in FIG. 1, the recessed surface 27a of the closing plate 27 includes a plurality of inclined portions. The recessed surface 27a includes a first inclined portion 27b, a second inclined portion 27c, a third inclined portion 27d, and a fourth inclined portion 27e from the outer peripheral side. An annular flat portion is formed between the inclined portions. The first inclined portion 27b and the second inclined portion 27c are located on the outer peripheral side of the first cylindrical portion 6b of the motor housing main body part 6. The first inclined portion 27b extends from the tip end side (the impeller 2 side) of the first end 5a of the motor housing main body part 6 to the base end side (the coil 4 side) in the axial direction. A step of the fourth inclined portion 27e is smaller than any of a step of the first inclined portion 27b, a step of the second inclined portion 27c, and a step of the third inclined portion 27d.

The recessed surface 27a formed by the inclined portions and the flat portions faces the flow path forming plate 23 provided at the first end 5a of the motor housing 5, and the exhaust flow path 33 which extends in the radial direction is formed between the recessed surface 27a and the flow path forming plate 23. The exhaust flow path 33 communicates with the exhaust port 25 at the center and communicates with the external air at the outer peripheral end.

A screw seat portion (not shown) which protrudes to the base end side at a predetermined angular pitch is formed on the closing plate 27. The closing plate 27 and the motor housing main body part 6 are fastened with a bolt or the like via the screw seat portion. Alternatively, the closing plate 27 and the motor housing main body part 6 are fastened with a bolt or the like while the flow path forming plate 23 is sandwiched between the screw seat portion and the motor housing main body part 6. The impeller housing 3 and the motor housing 5 are connected to each other with the closing plate 27 interposed therebetween. Then, the exhaust flow path 33 is formed between the flow path forming plate 23 and the closing plate 27.

A tip end-side middle diameter portion 8*d* is formed on the tip end side of the rotating shaft 8 from the flow path forming plate 23. A cooling fan 34 made of, for example, aluminum is fitted and inserted into the tip end-side middle diameter portion 8*d*. The cooling fan 34 is provided in the exhaust flow path 33 to face the exhaust port 25.

Figure 4:
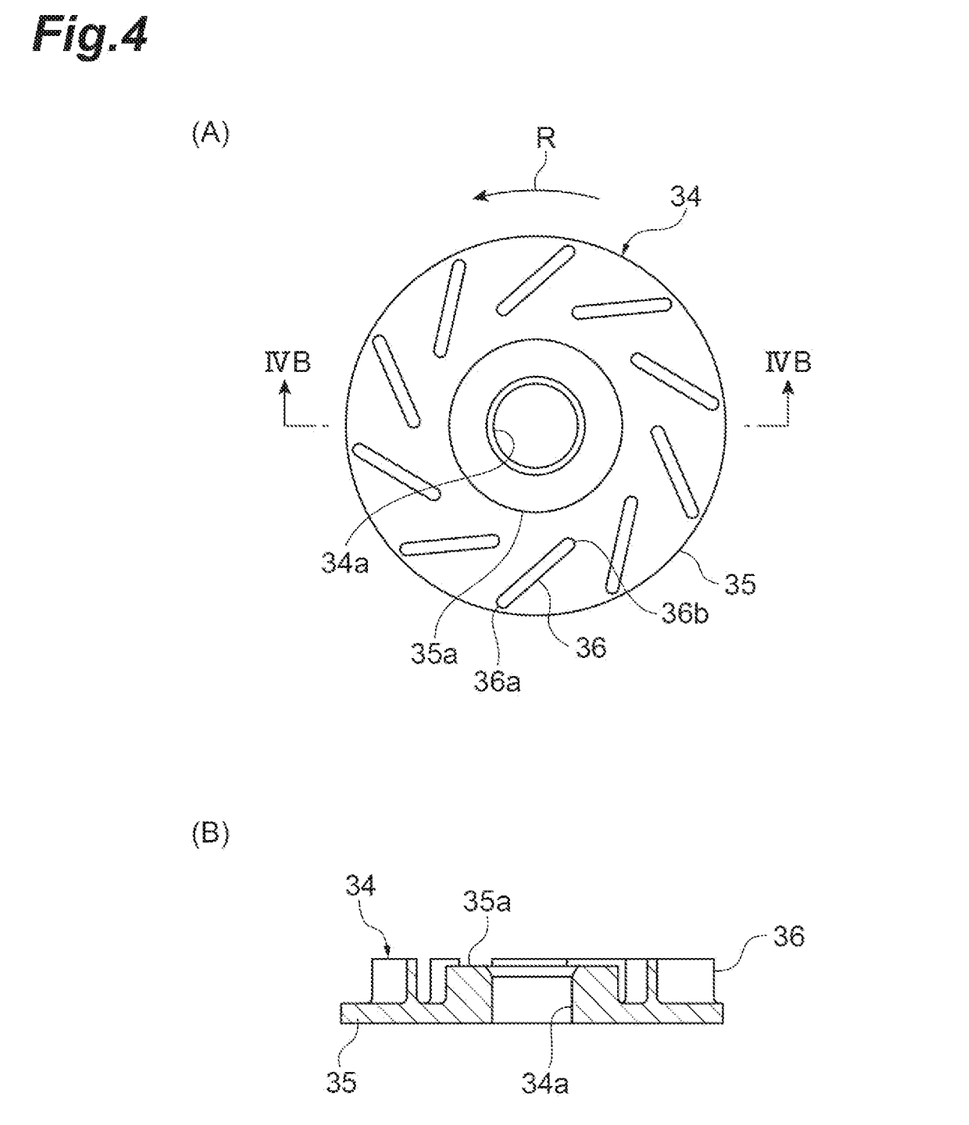
FIG. 4(A) is a front view showing a cooling fan in FIG. 1.
FIG. 4(B) is a cross-sectional view taken along line IVB-IVB of FIG. 4(A).

As shown in FIGS. 1, 4(A) and 4(B), the cooling fan 34 includes a boss portion 35*a* through which the tip end-side middle diameter portion 8*d* of the rotating shaft 8 is inserted. An insertion hole 34*a* is formed in the boss portion 35*a*, and the tip end-side middle diameter portion 8*d* is inserted through the insertion hole 34*a*. On the other hand, an annular step portion 8*f* which extends contiguously from the tip end-side middle diameter portion 8*d* and has a diameter that is larger than that of the tip end-side middle diameter portion 8*d* is formed on the rotating shaft 8. The step portion 8*f* is located between the motor housing main body part 6 and the impeller 2 and faces the boss portion 2*a* of the impeller 2.

Further, a tip end-side small diameter portion 8*e* is formed on the tip end side of the tip end-side middle diameter portion 8*d*. The tip end-side small diameter portion 8*e* corresponds to the above-described first end portion 8*b*. The impeller 2 is fitted and inserted into the tip end-side small diameter portion 8*e*. A fastening nut is screwed to the tip end side of the impeller 2. When the fastening nut is tightened, an axial force is generated, and the impeller 2 and the cooling fan 34 are mounted on the rotating shaft 8. In other words, a pressing force against the boss portion 2*a* of the impeller 2 and the cooling fan 34 is generated from the fastening nut. That is, the boss portion 35*a* of the cooling fan 34 and the impeller 2 are held between the step portion 8*f* of the rotating shaft 8 and the fastening nut.

The impeller 2 presses the boss portion 35*a* of the cooling fan 34 with the boss portion 2*a* which is a part of the back surface. A gap is formed between the hub portion of the impeller 2 and the cooling fan 34, and the closing plate 27 is located in the gap.

As shown in FIGS. 4(A) and 4(B), the cooling fan 34 includes the boss portion 35*a*, an insertion hole 34*a* formed in the boss portion 35*a*, a disk portion 35 which extends radially outward from an end surface of the boss portion 35*a* on the tip end side, and a plurality of blade portions (rotating blades) 36 which stand upright on the disk portion 35 and protrude to the base end side. That is, the blade portions 36 are mounted on the first end portion 8*b* of the rotating shaft 8 via the disk portion 35.

The blade portions 36 are disposed between the exhaust port 25 and the exhaust flow path 33 and are rotatable with the rotating shaft 8. The boss portion 35*a* and the blade portions 36 are spaced apart from each other in the radial direction. The plurality of blade portions 36 are spaced apart from each other in the circumferential direction and are disposed, for example, at regular intervals. Each of the blade portions 36 includes an inner end 36*b* which is located closer to the rotating shaft 8 and an outer end 36*a* which is located farther from the rotating shaft 8. Additionally, each of the blade portions 36 extends between the inner end 36*b* and the outer end 36*a*. The outer end 36*a* is located upstream from the inner end 36*b* in the rotational direction R of the rotating shaft 8. Still further, each of the blade portions 36 extends from the inner end 36*b* toward the outer end 36*a* in a direction opposite to the rotational direction R. The blade portions 36 extend, for example, near an outer peripheral end of the disk portion 35.

As shown in FIG. 1, the boss portion 35*a* of the cooling fan 34 is located on the inner peripheral side from the flow path forming plate 23. A diameter of the cooling fan 34 is larger than a diameter of the exhaust port 25 of the flow path forming plate 23. More specifically, the blade portion 36 may extend to the outer peripheral side further than the flow path forming hole 23*c* (refer to FIG. 3B) of the flow path forming plate 23. In other words, the exhaust port 25 is located inside the outer end 36*a* of the blade portion 36. The outer end 36*a* of the blade portion 36 is provided within a range of the recessed portion 23*d* of the flow path forming plate 23 in the radial direction. A part of the blade portion 36 (a tip end portion farthest from the disk portion 35 in the axial direction) may be configured to enter the recessed portion 23*d* of the flow path forming plate 23. Accordingly, the recessed portion 23*d* of the flow path forming plate 23 may accommodate a part of the blade portion 36.

Figure 7:
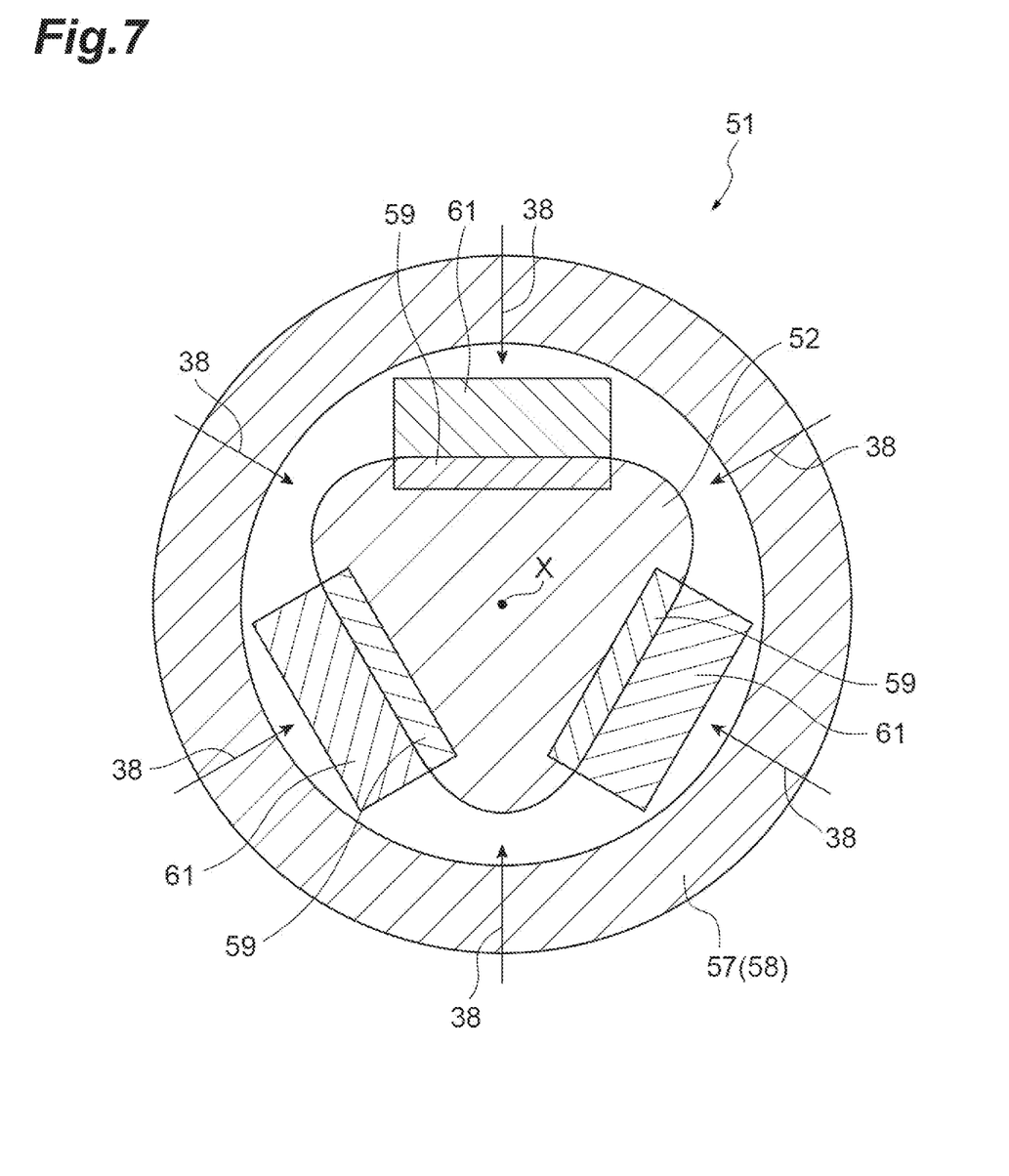
FIG. 7 is a cross-sectional view taken along line VII-VII of FIG. 1.

Subsequently, the inverter part 51 will be further described with reference to FIGS. 1 and 7. FIG. 7 is a cross-sectional view taken along line VII-VII in FIG. 1. In the description of the inverter part 51, when the terms "axial direction", "diameter direction" and "circumferential direction" are simply used, they mean a direction of the rotating shaft (a direction of the rotation axis X), rotation radial direction, and rotation circumferential direction of the rotor 8*a* and the rotating shaft 8.

The inverter part 51 is disposed adjacent to the base end side of the motor part 41. The inverter part 51 includes an inverter unit 52 which supplies drive power to the motor part 41, and an inverter housing 53 which accommodates the inverter unit 52. The inverter housing 53 is connected to the motor housing 5 in the axial direction and has a cylindrical shape coaxial with the motor housing 5.

The inverter housing 53 has a side wall 54 and a lid portion 55. The side wall 54 has a cylindrical shape which extends in the axial direction with the rotation axis X as a cylinder axis. The lid portion 55 has a disk shape and closes an end surface of the side wall 54 on the base end side. The inverter unit 52 is accommodated in the inverter chamber 56 surrounded by the side wall 54 and the lid portion 55. The inverter chamber 56 communicates with the inside of the motor housing 5 via the ventilation port 14.

In the present disclosure, almost the entire side wall 54 is configured of a cylindrical dustproof air filter 57. The air filter 57 allows external air to pass through the inverter chamber 56 while capturing dust. The side wall 54 may include a frame portion (not shown) which holds the cylindrical structure of the air filter 57. The outer periphery of the frame portion of the side wall 54 may be covered with the cylindrical air filter 57. With the above configuration, almost the entire side wall 54 functions as an intake port 58 for suctioning cooling air 38 from the outside into the inverter chamber 56. As described above, the intake port 58 is provided in the side wall 54 of the inverter housing 53, and the air filter 57 is provided in the intake port 58.

The inverter unit 52 is mounted on the lid portion 55 and extends in the direction of the rotation axis. The inverter unit 52 is disposed to be arranged in the axial direction with respect to the coil 4. When seen in the radial direction, the inverter unit 52 and the coil 4 are disposed at positions at which they do not overlap each other. Alternatively, it can be said that the inverter unit 52 and the coil 4 are disposed at positions at which they do not overlap with each other in the axial direction. Further, the inverter unit 52 is disposed in a region in which the rotation axis X intersects inside the intake port 58. Alternatively, it can be said that there is an overlap between a position of the intake port 58 in the direction of the rotation axis and a position of the inverter unit 52 in the direction of the rotation axis. Further, the inverter unit 52 faces the intake port 58 in the radial direction with a heat sink described later interposed therebetween. The inverter unit 52 is disposed around the rotation axis X in a region relatively close to the rotation axis X. Alternatively, it can be said that the inverter unit 52 surrounds the rotation axis X and is disposed in the circumferential direction.

Further, when seen in the radial direction, a part of the rotating shaft 8 on the base end side is in a positional relationship in which it overlaps the inverter unit 52. Alternatively, a position of the part of the rotating shaft 8 on the base end side in the direction of the rotation axis overlaps a position of the inverter unit 52 in the direction of the rotation axis. Further, a part of the rotating shaft 8 on the base end side faces the inverter unit 52 in the radial direction. More specifically, a recessed portion 52a for avoiding interference with the base end portion of the rotating shaft 8 is provided at a portion of the inverter unit 52 on the rotation axis X. The base end portion of the rotating shaft 8 is inserted into the recessed portion 52a and is not in contact with the inverter unit 52. That is, the inverter unit 52 is formed to surround the base end side of the rotating shaft 8 in the circumferential direction. In other words, a part of the rotating shaft 8 on the base end side is surrounded by the inverter unit 52 around the direction of the rotating shaft. The inverter unit 52 is not limited to one mass object as schematically shown in FIGS. 1 and 7 and may be an assembly of a circuit board on which electronic components are mounted. In this case, the recessed portion 52a is configured as a gap between the circuit boards or the electronic components, and the base end portion of the rotating shaft 8 is inserted into the gap.

The inverter unit 52 has an inverter circuit (not shown) constructed on a circuit board. The inverter circuit supplies a current to the coil 4 to control the rotation of the rotor 8a. Although detailed illustration of the inverter circuit is omitted, the electronic components constituting the inverter circuit include a plurality of (three in the case of the present embodiment) semiconductor elements 59. The semiconductor element 59 becomes a main heat source during operation. The semiconductor element 59 is a switching element such as an IGBT. The semiconductor element 59 is disposed at the outermost peripheral portion of the inverter unit 52 in the radial direction. A plurality of heat sinks 61 are mounted on the outer peripheral portion of the inverter unit 52. Each of the heat sinks 61 is in close contact with the semiconductor element 59. The heat sink 61 is disposed to protrude radially outward from the inverter unit 52 and faces the intake port 58 with a gap.

Next, an operation of the centrifugal blower 1 will be described. The centrifugal blower 1 can be used, for example, for blowing or suctioning air. When the centrifugal blower 1 is used for blowing air, an object to be blown is provided at an end of an outlet of the main air flow 32 (that is, on the downstream side). When the centrifugal blower 1 is used for suctioning air, an object to be suctioned is provided in front of (that is, upstream of) the inlet port (the opening 30a) of the main air flow 32.

When electric power is supplied from the inverter unit 52 to the coil 4 through a wire (not shown), a rotating magnetic field is generated between the coil 4 and the rotor 8a of the rotating shaft 8, and the rotating shaft 8 rotates.

The impeller 2 rotates with the rotation of the rotating shaft 8, and the main air flow 32 is suctioned into the impeller housing 3 by the rotation of the impeller 2. When the centrifugal blower 1 is used for suctioning air, the air is suctioned from a predetermined object to be suctioned. When the centrifugal blower 1 is used for blowing air, the main air flow 32 suctioned into the impeller housing 3 is blown to a predetermined object to be blown via the diffuser 29 and the scroll 31.

Further, during the operation of the centrifugal blower 1, the cooling fan 34 also rotates together with the impeller 2. Due to the rotation of the cooling fan 34, the air inside the motor housing 5 and the inverter chamber 56 is suctioned through the exhaust port 25. Since the inside of the motor housing 5 and the inverter chamber 56 have a negative pressure, external air is suctioned into the inverter chamber 56 as cooling air 38 through the intake port 58. The cooling air 38 passes through the intake port 58 toward the inside mainly in the radial direction and comes into contact with the heat sink 61 which faces the intake port 58. Thus, the semiconductor element 59 of the inverter unit 52 is cooled via the heat sink 61.

Then, the cooling air 38 flows into the motor housing 5 from the inverter chamber 56 through the ventilation port 14. Then, the cooling air 38 circulates between the in-housing flow path 50 formed in the motor housing main body part 6 and the coil 4 and the rotor 8a. When the cooling air 38 flows through the in-housing flow path 50, the cooling air 38 can also flow through the groove 9 formed on the inner peripheral surface of the motor housing main body part 6.

The cooling air 38 flowing through the inside of the motor housing main body part 6 reaches the space 24 via the opening 20. The cooling air 38 which has reached the space 24 is deflected toward the center by the flow path forming plate 23. The cooling air 38 deflected toward the center is exhausted from the exhaust port 25 to the outside of the motor housing 5.

The cooling air 38 exhausted from the exhaust port 25 and suctioned into the cooling fan 34 is exhausted outward in the radial direction, flows through the exhaust flow path 33, is guided by the recessed surface 27a including the plurality of inclined portions and is exhausted to the outside of the centrifugal blower 1.

During the operation of the centrifugal blower 1, although heat sources such as the coil 4 including the conductive wire and the stator core generate heat, the coil 4 is cooled by the cooling air 38 flowing in the motor housing main body part 6 and further cooled by the radiation fins 7 which exchange heat with the external air. Heat sources other than the coil 4 include, for example, the rotor 8a including a permanent magnet, the first bearing part 18, the second bearing part 11, and an air gap. The air gap is a flow of air which may be generated between the rotor 8a and the coil 4 in the rotational direction (the rotational direction R) of the rotor 8a. The air gap causes windage. Further, as described above, in the inverter unit 52, the semiconductor element 59 is the main heat source during operation. The semiconductor element 59 is cooled by the cooling air 38 via the heat sink 61. In the present embodiment, all of the above heat sources may be cooled directly or indirectly.

The in-housing flow path 50 formed in the motor housing 5 functions as a motor cooling flow path which allows the cooling air 38 to pass therethrough and cools the electric motor 10. Further, the exhaust flow path 33 formed at a position between the motor housing 5 and the impeller 2 functions as a fan accommodation flow path which accommodates the cooling fan 34 and allows the cooling air 38 to pass therethrough in the radial direction. Further, the inverter chamber 56 formed in the inverter housing 53 functions as an inverter cooling flow path which allows the cooling air 38 to pass therethrough and cools the inverter unit 52. Additionally, the exhaust flow path 33, the in-housing flow path 50, and the inverter chamber 56 are arranged in the axial direction along the rotating shaft 8 and communicate with each other.

The operation and effect of the centrifugal blower 1 of the present embodiment described above will be described. In the centrifugal blower 1, as shown in FIG. 1, the inverter unit 52 and the coil 4 are disposed to be arranged in the axial direction. Therefore, both the inverter unit 52 and the coil 4 of the motor part 41 can be cooled by the cooling air 38 which flows in one direction in the axial direction. Specifically, the inverter housing 53 and the motor housing 5 form a cylindrical shape coaxial with each other, and both are connected in the axial direction. Since the inside of the motor housing 5 and the inside of the inverter housing 53 communicate with each other, a cooling flow path connected in series in the axial direction is formed between the inside of the motor housing 5 and the inside of the inverter housing 53.

The cooling fan 34 is disposed on the tip end side of the motor housing 5, and the side wall 54 of the inverter housing 53 serves as the intake port 58. During the operation of the centrifugal blower 1, the cooling air 38 flows from the intake port 58 to the cooling fan 34. That is, the cooling air 38 passes through the inverter housing 53 and the motor housing 5 in order. The cooling air 38 cools the inverter unit 52 on the upstream side and the coil 4 and the like on the downstream side. In this way, the cooling fan 34 for cooling the coil 4 and the like and the inverter unit 52 is shared. Further, the flow path of the cooling air 38 for cooling the coil 4 and the like and the inverter unit 52 is shared. As a result, a size of the centrifugal blower 1 can be reduced as compared with a case in which the cooling fan for cooling the coil 4 and the like and the cooling fan for cooling the inverter unit 52 are separately provided.

Further, in the centrifugal blower 1, the inverter part 51 is disposed adjacent to the motor part 41 in the axial direction. Additionally, the air filter 57 of the intake port 58 provided in the side wall 54 of the inverter housing 53 has a cylindrical shape with the rotation axis X as the cylinder axis. With such a structure, a wider filter area of the air filter 57 can be secured as compared with a structure in which an intake port is provided in an end surface orthogonal to the axial direction.

In this structure, a cylindrical hollow portion of the air filter 57 tends to be a dead space in order to widen the filter area, but the hollow portion is effectively used as an installation space for the inverter unit 52. Further, the inverter unit 52 is disposed at a position inside the intake port 58 in the radial direction, and the heat sink 61 is provided to face the intake port 58. According to such an arrangement, the cooling air 38 suctioned through the intake port 58 easily comes into contact with the heat sink 61. Further, the filter area of the air filter 57 can be adjusted without affecting a radial dimension by adjusting an axial dimension of the inverter part 51. Therefore, it is relatively easy to change a design of the filter area of the air filter 57.

Further, in the centrifugal blower 1, since the inverter unit 52 is disposed in the region in which the rotation axis X intersects, a flow space for the cooling air 38 is secured between the inverter unit 52 and the intake port 58. Additionally, the heat sink 61 can be disposed in the space, and the cooling efficiency is improved.

Further, when the inverter unit 52 is disposed at a position close to the rotation axis X in the radial direction, the inverter unit 52 and the rotating shaft 8 may interfere with each other. When the inverter unit 52 is disposed far away from the rotating shaft 8 in the axial direction in order to avoid this interference, the axial dimension of the inverter unit 52 becomes large. On the other hand, in the centrifugal blower 1, a part of the rotating shaft 8 is disposed to overlap the inverter unit 52 when seen in the radial direction. With such a configuration, the position of the inverter unit 52 can be brought closer to the rotor 8a side while the interference between the inverter unit 52 and the rotating shaft 8 is avoided, and the axial dimension of the inverter unit 52 can be curbed.

Further, in the centrifugal blower 1, the inverter unit 52 is fixed to the lid portion 55 as described above, and the inverter unit 52, the lid portion 55, and the heat sink 61 are integrally packaged. With such a structure, when the lid portion 55 is axially removed from the side wall 54, the inverter unit 52 and the heat sink 61 are also pulled out from the side wall 54 following the lid portion 55. Therefore, the inverter unit 52 and the like can be removed relatively easily, and a replacement work of the air filter 57 on the side wall 54 is also relatively easy.

Further, in the centrifugal blower 1, since the first bearing part 18 and the second bearing part 11 which pivotally support the rotating shaft 8 are gas bearings, when there is a lot of dust in the motor housing 5, a malfunction of the bearing function may occur. On the other hand, since the air filter 57 is provided in the intake port 58 of the inverter part 51, the cooling air 38 which has passed through the air filter 57 and is sufficiently dust-removed flows into the motor housing 5. Therefore, the possibility of malfunction of the first bearing part 18 and the second bearing part 11 due to dust is reduced.

The cooling air 38 readily flows in the motor housing 5 through the groove 9 formed in the inner peripheral surface of the motor housing 5. The cooling air 38 easily cools the heat sources such as the coil 4. For example, the cooling air 38 flowing in the groove 9 can directly cool the coil 4 and the stator core of the rotor 8a. The cooling air 38 can also indirectly cool the heat sources other than the coil 4 and the stator core.

Further, the cooling fan 34 is provided on the rotating shaft 8 and rotates together with the impeller 2. Therefore, it is not necessary to separately provide an electric motor for rotating the cooling fan 34. Compared with a case in which an electric motor for suctioning external air as cooling air is separately provided, it is possible to reduce manufacturing cost of the centrifugal blower 1 and to reduce a size of the device.

The present disclosure can be carried out in various forms having various changes and improvements based on the knowledge of those skilled in the art including the above-described embodiment. It is also possible to construct a modified example of the embodiment by utilizing the technical matters described in the above-described embodiment. The configurations of the respective embodiments may be combined and used as appropriate.

In the above embodiment, the example in which the cooling fan 34 is a centrifugal fan which suctions the cooling air 38 from the central portion and exhausts the cooling air 38 in the outer diameter direction has been described, but the present invention is not limited thereto. The cooling fan 34 may be an axial flow fan provided in the exhaust port 25 or may be a fan of another type. The rotating blade may be mounted directly on the rotating shaft 8. Further, in the above embodiment, the cooling air 38 flows to be suctioned from the intake port 58 and discharged from the exhaust flow path 33, but a flow direction of the cooling air 38 may be reversed. That is, the cooling air 38 may be suctioned from the exhaust flow path 33 and discharged from the intake port 58. In this case, the coil 4 and the like of the motor part 41 are cooled on the upstream side of the cooling air 38, and the inverter unit 52 is cooled on the downstream side. Further, in the above embodiment, the intake port 58 is provided in the side wall 54, but the intake port may be provided in the lid portion 55. Further, the intake port may be provided in both the side wall 54 and the lid portion 55.

In the above embodiment, the cooling structure using the centrifugal blower 1 as an example has been described, but the present disclosure is also applicable to a centrifugal compressor. A fluid machine to which the present disclosure is applied may be an axial flow type blower or compressor.

REFERENCE SIGNS LIST

1 Centrifugal blower (fluid machine)
2 Impeller
4 Coil (stator)
5 Motor housing
8 Rotating shaft
8a Rotor
10 Electric motor
11 Second bearing part (gas bearing)
18 First bearing part (gas bearing)
33 Exhaust flow path (fan accommodation flow path)
34 Cooling fan
38 Cooling air
41 Motor part
50 In-housing flow path (motor cooling flow path)
51 Inverter part
52 Inverter unit
53 Inverter housing
54 Side wall
56 Inverter chamber (inverter cooling flow path)
57 Air filter
58 Intake port
61 Heat sink
X rotation axis

The invention claimed is:

1. A fluid machine comprising:
a motor part having a rotating shaft, an electric motor configured to rotate the rotating shaft, and a motor housing configured to accommodate the electric motor;
an inverter part having an inverter unit configured to supply drive power to the motor part, and an inverter housing connected to the motor housing in an axial direction of the rotating shaft and configured to accommodate the inverter unit, wherein the inverter unit comprises electronic components, and the inverter housing comprises a cylindrical side wall, a cylinder axis of the cylindrical side wall is aligned with a rotation axis of the rotating shaft;
a cooling fan provided on the rotating shaft and configured to allow cooling air to flow through the inverter housing and the motor housing in order, wherein the cooling fan is disposed at an end of the motor housing opposite to an end of the motor housing at which the inverter housing is disposed, the cylindrical side wall of the inverter housing comprises an intake port for the cooling air, and the electronic components of the inverter unit are disposed facing the intake port of the inverter housing in a radial direction; and
an impeller provided on the rotating shaft, wherein the impeller is separate from the cooling fan,
wherein the inverter unit is disposed to be arranged with respect to the electric motor in the axial direction of the rotating shaft.

2. The fluid machine according to claim 1, wherein the cylindrical side wall extends in a direction of the rotation axis of the rotating shaft, and the intake port suctions the cooling air from an outside.

3. The fluid machine according to claim 1, wherein a heat sink that faces the intake port is mounted on an outer peripheral portion of the inverter unit.

4. The fluid machine according to claim 1, wherein the inverter housing has an air filter provided in the intake port.

5. The fluid machine according to claim 4, wherein the motor part has a gas bearing that pivotally supports the rotating shaft.

6. The fluid machine according to claim 1, wherein a part of the rotating shaft is disposed to be surrounded by the inverter unit.

7. The fluid machine according to claim 1, wherein the cooling fan is provided on the rotating shaft such that the cooling air flows through the inverter housing and motor housing before reaching the cooling fan.

8. The fluid machine according to claim 7, wherein the cooling air from the cooling fan is discharged to an exterior of the fluid machine in a radial direction.

9. The fluid machine according to claim 1, wherein the inverter unit surrounds the rotating shaft, and the electronic components of the inverter unit are disposed at an outermost peripheral portion of the inverter unit in the radial direction.

10. The fluid machine according to claim 1, wherein the inverter housing further comprises a lid portion that closes an end surface of the cylindrical side wall, and the inverter unit is mounted on the lid portion.

11. The machine according to claim 10, wherein the cylindrical side wall is mounted on the lid portion of the inverter housing.

12. The fluid machine according to claim 1, wherein an end of the rotating shaft is inserted into a recessed portion of the inverter unit, and the inverter unit surrounds the end of the rotating shaft.

13. The fluid machine according to claim 1, further comprising heat sinks in contact with and extending outward radially from the electronic components, respectively.

* * * * *